United States Patent [19]
Dolan et al.

[11] Patent Number: 5,787,027
[45] Date of Patent: Jul. 28, 1998

[54] NOISE TOLERANT HVAC SYSTEM

[75] Inventors: Robert P. Dolan, Syracuse; Thomas R. Phillips, Cicero; Thomas L. DeWolf, Liverpool; Mark A. Hill, Lafayette, all of N.Y.

[73] Assignee: Carrier Corporation, Syracuse, N.Y.

[21] Appl. No.: 929,143

[22] Filed: Sep. 10, 1997

Related U.S. Application Data

[63] Continuation of Ser. No. 578,349, Dec. 26, 1995, abandoned.

[51] Int. Cl.$^6$ ............................................. G01F 7/00
[52] U.S. Cl. ............................................. 364/505; 236/47.3
[58] Field of Search .............. 364/505; 371/21.1–21.6, 371/40.11–40.18, 49.1–51.1; 395/182.04; 236/51, 49.3; 340/825.06

[56] References Cited

U.S. PATENT DOCUMENTS

| | | | |
|---|---|---|---|
| 5,097,449 | 3/1992 | Cuevas | 365/228 |
| 5,103,391 | 4/1992 | Barrett | 364/133 |
| 5,104,037 | 4/1992 | Karg et al. | 236/46 R |
| 5,111,457 | 5/1992 | Rabjohns et al. | 371/10.1 |
| 5,359,659 | 10/1994 | Rosenthal | 380/4 |
| 5,426,585 | 6/1995 | Stepper et al. | 364/424.03 |
| 5,454,510 | 10/1995 | Manson et al. | 236/51 |
| 5,495,722 | 3/1996 | Manson et al. | 236/51 |
| 5,539,879 | 7/1996 | Pearce et al. | 395/184.01 |
| 5,553,238 | 9/1996 | Nelson | 395/185.07 |
| 5,555,509 | 9/1996 | Nolan et al. | 364/505 |
| 5,565,855 | 10/1996 | Knibbe | 340/825.06 |
| 5,579,482 | 11/1996 | Einkauf et al. | 395/200.1 |
| 5,579,993 | 12/1996 | Ahmed et al. | 236/49.3 |
| 5,590,831 | 1/1997 | Manson et al. | 236/51 |

FOREIGN PATENT DOCUMENTS

| | | |
|---|---|---|
| 615211 | 9/1994 | European Pat. Off. |
| 63-298602 | 6/1988 | Japan |
| 05165734 | 2/1993 | Japan |
| 07210215 | 11/1995 | Japan |

*Primary Examiner*—James P. Trammell

[57] ABSTRACT

HVAC control information is stored in a memory associated with a programmable processor in such a manner as to be recallable in a potentially high electrical noise environment. The HVAC control information is stored along with corresponding verification images in particular memory locations. The verification images for at least some of the HVAC control information have unique mathematical relationships with respect to the stored pieces of HVAC control information.

20 Claims, 3 Drawing Sheets

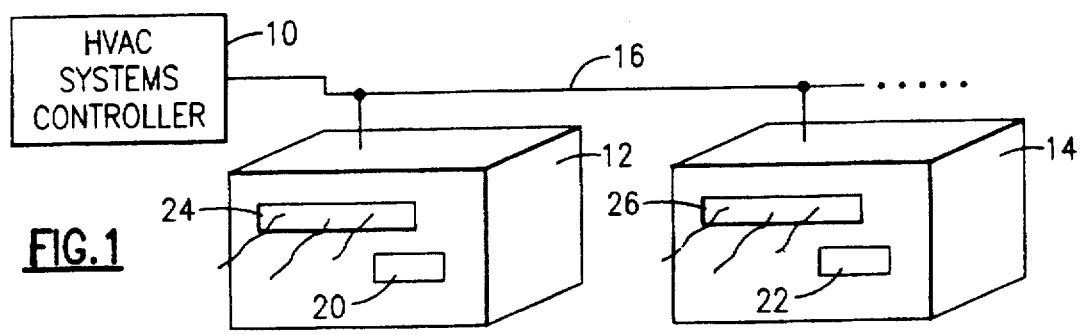

FIG.1

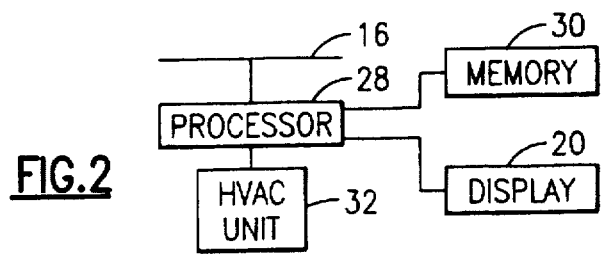

FIG.2

| MEMORY ADDRESS INDEX "i" | ADDRESSABLE LOCATION | |
|---|---|---|
| | PARAMETER STORED IN LOWER BYTE | TYPE OF VERIFICATION IMAGE IN UPPER BYTE |
| 0 | HEAT CONTROL | SAME VALUE |
| ⋮ | ⋮ | ⋮ |
| 5 | FAN CONTROL | SAME VALUE |
| 6 | HVAC TYPE | ONES COMPLEMENT |
| 7 | HVAC TYPE | ONES COMPLEMENT |
| 8 | HVAC TYPE | ONES COMPLEMENT |
| 9 | NETWORK ID | TWOS COMPLEMENT |
| 10 | NETWORK ID | TWOS COMPLEMENT |
| 11 | NETWORK ID | TWOS COMPLEMENT |

FIG.3

| MEMORY ADDRESS INDEX | CONTROL VARIABLE | DEFAULT VALUE | RANGE OF VALUES |
|---|---|---|---|
| 0 | VARIABLE (0) | DEFAULT 1 | RANGE 1 |
| ⋮ | ⋮ | ⋮ | ⋮ |
| 5 | VARIABLE (5) | DEFAULT 6 | RANGE 6 |
| 6 | UNIT_TYPE | DEFAULT 7 | RANGE 7 |
| 7 | UNIT_TYPE | DEFAULT 7 | RANGE 7 |
| 8 | UNIT_TYPE | DEFAULT 7 | RANGE 7 |
| 9 | NTWK_ID | DEFAULT 8 | RANGE 8 |
| 10 | NTWK_ID | DEFAULT 8 | RANGE 8 |
| 11 | NTWK_ID | DEFAULT 8 | RANGE 8 |

FIG.5

NOISE TOLERANT HVAC SYSTEM

This application is a continuation of application Ser. No. 08/578,349, filed Dec. 26, 1995, now abandoned.

BACKGROUND OF THE INVENTION

This invention relates to the control of a heating ventilating and air conditioning system by a programmable processor. In particular, this invention relates to how information may be reliably read from a memory associated with such a processor when the information is being read from the memory in a high electrical noise environment.

The control of a heating, ventilating and air conditioning (HVAC) system is often performed in a relatively strong electrical noise environment. This environment is due at least in part to relatively large electrical motors required for compressors, fans and other components of a typical HVAC system being located close to the control circuitry. Other sources of noise may also be near the control circuitry.

One particular part of the control circuitry that may be vulnerable to noise is that of the memory associated with the processor that controls the HVAC system. It has been found that low voltage communications between the memory and the processor can be impacted by electrical noise. The noise may introduce errors in the addressing of memory as well as the values read from the storage locations in memory. This will lead to the processor reading and assigning incorrect values to particular control variables used by the programmed processor to control the HVAC system. Assigning erroneous control values to certain of these control variables could cause a complete loss of the effective control of the HVAC system.

OBJECTS OF THE INVENTION

It is an object of the invention to provide a stored configuration of recallable HVAC control information in a memory associated with a processor that allows the processor to confirm in a potentially high electrical noise environment that the stored HVAC control information has been accurately read from the memory.

SUMMARY OF THE INVENTION

The above and other objects of the invention are achieved by providing a particular configuration of stored HVAC control information in a memory associated with a programmable processor. In accordance with the invention, the control information is stored in particular storage locations in the memory that have been associated with particular control parameters used by the processor during the control of an HVAC system. Verification images of the control information are also created and stored in these same storage locations. The verification images of at least some of the pieces of the control information have unique mathematical relationships to the particular piece of control information. This allows the processor to confirm that the control information applicable to these critical control parameters has been accurately read from the appropriate storage location. In accordance with another aspect of the invention, values of these critical control parameters and the respective verification images therefore are preferably stored in more than one memory location.

BRIEF DESCRIPTION OF THE DRAWINGS

Other objects and advantages of the present invention will be apparent from the following description in conjunction with the accompanying drawings in which:

FIG. 1 illustrates a plurality of HVAC systems each connected via a common control bus to an HVAC systems controller;

FIG. 2 illustrates a particular HVAC system having a processor connected to a control bus of FIG. 1 and being furthermore connected to an HVAC unit for providing conditioned air;

FIG. 3 illustrates the storage of information for the HVAC system of FIG. 2 in a memory associated with the processor of FIG. 2.

FIG. 5 illustrates a look up table used by the processor in executing the process of FIGS. 4A–4B.

DESCRIPTION OF THE PREFERRED EMBODIMENT

Figure 4A:
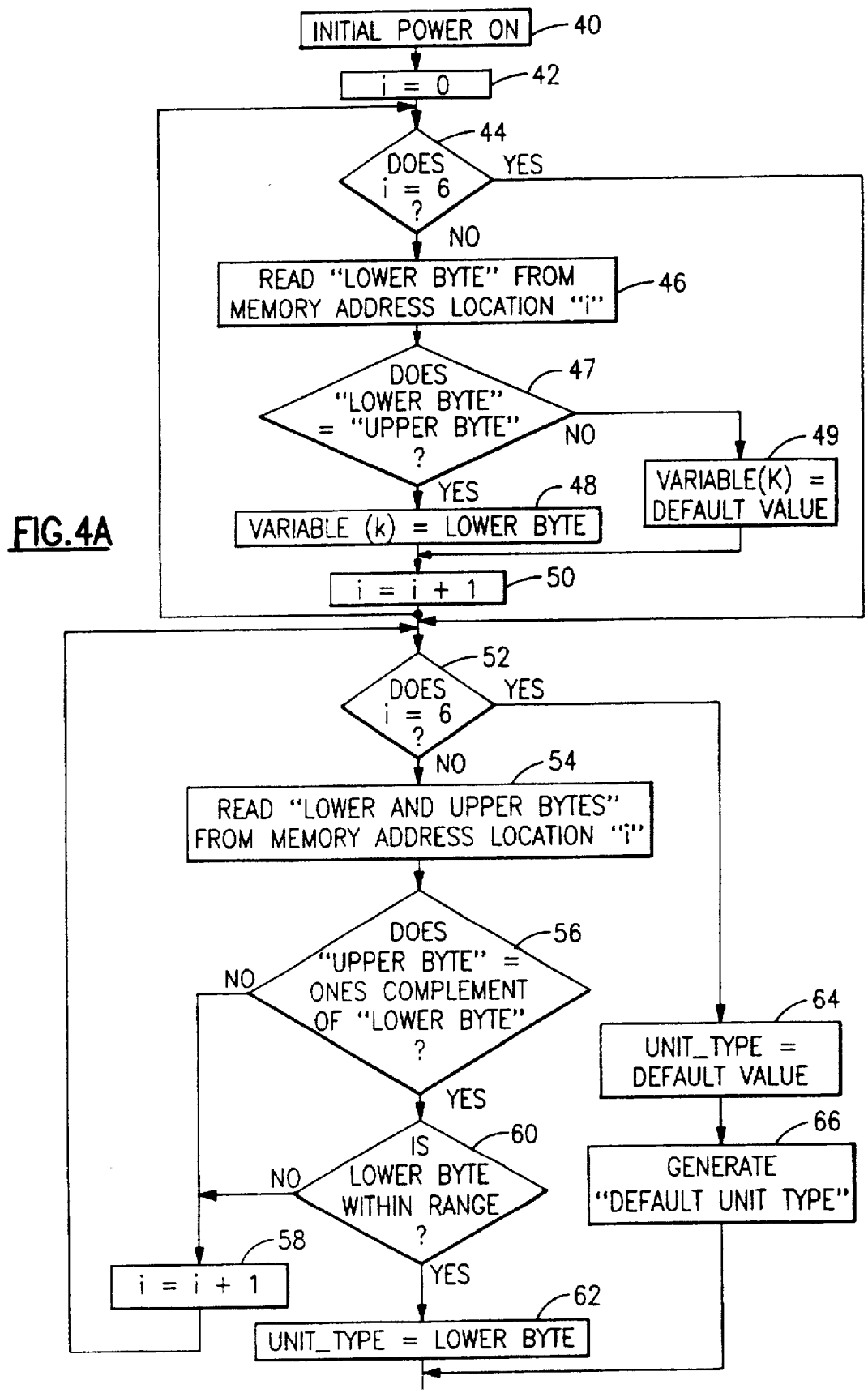
FIGS. 4A–4B illustrate a process executable by the processor of FIG. 2 for reading information from the memory associated with the processor.
Figure 4B:
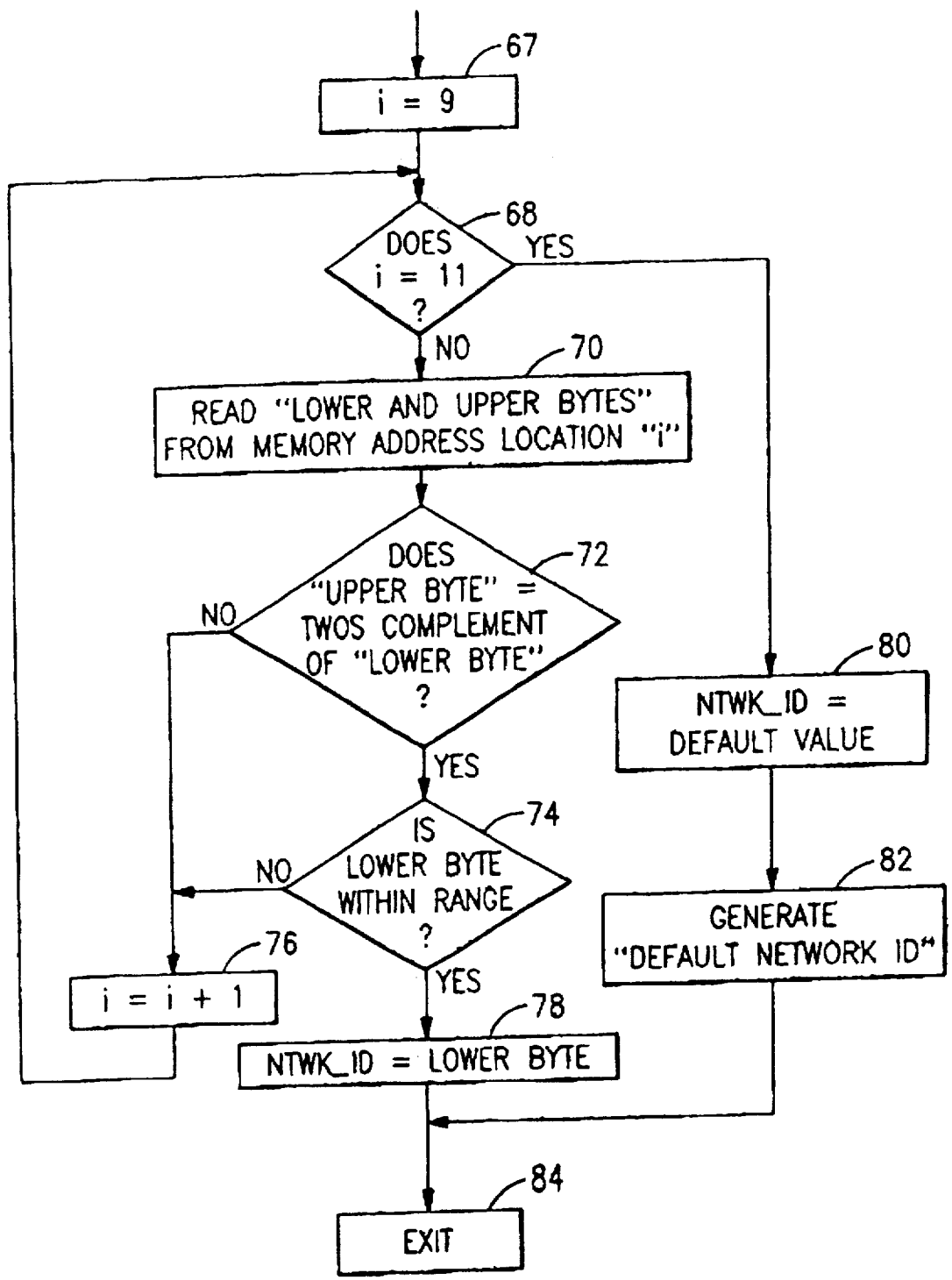

Referring to FIG. 1, an HVAC systems controller 10 is connected to an HVAC system 12 and an HVAC system 14 via a control bus 16. Each HVAC system receives control information from the HVAC systems controller 10. Each HVAC system includes a display such as 20 or 22 which is used to display information relative to the status of operation of the particular system. The HVAC system 12 provides conditioned air through a ventilated opening 24 whereas the HVAC system 14 provides conditioned air via a ventilated opening 26. It is to be appreciated that there may be many more HVAC systems connected to the control bus 16. These HVAC systems may be installed in one large room or in several rooms of a building that is to be provided with conditioned air by the various systems. Control information is normally provided to each individual system by the HVAC system controller 10 identifying a particular HVAC system through its particular network identification and thereafter communicating information to that particularly identified system.

Referring now to FIG. 2, the internal configuration of the HVAC system 12 is illustrated. A processor 28 within the HVAC system 12 is connected to the control so as to be in communication with the HVAC systems controller 10. The processor is also connected to a control memory 30 as well as to the display 20 for the HVAC system 12. The control memory 30 is preferably a non-volatile memory such as an electrically erasable programmable read only memory (EEPROM). Control information stored in such a memory will survive a power outage. The processor utilizes the stored control information in the memory 30 to control a particular HVAC unit 32 within the HVAC system 12. The HVAC unit 32 may be one of several different types of HVAC units. The particular type is preferably identified by a separate unit type control parameter stored in the memory 30.

Referring now to FIG. 3, an example of how control information for the HVAC system 12 may be stored in memory 30 is illustrated. The examplary control information is stored in addressable memory locations having address indexes numbered zero through eleven. It is to be understood that these address indexes can represent or be easily mapped to the particular addresses of these memory locations. Each addressable storage location has a stored control parameter value in a lower byte portion of the addressable location and a stored verification image of the control parameter value in each upper byte portion of the same addressable storage location.

The control parameter value stored in the memory location having an address index of zero is preferably the heat control setting for the HVAC unit 32 whereas the control parameter value in memory location having an address of five is preferably a fan control setting for the HVAC unit 32. The stored verification images for the heat control parameter and for the fan control parameter are preferably set equal to the same value stored in the lower byte portions of these memory locations. It is to be understood that other control parameter values having an equivalency type of verification image are to be stored in memory locations having address indexes one through four.

A control parameter value particularly identifying the HVAC unit 32 is preferably stored in the lower byte portions of three successive memory locations having address indexes six through eight. This control parameter preferably identifies the type of unit the HVAC unit 32 is. Control programs executable by the processor typically use such a control parameter to identify a particular control interface that may need to be used with the HVAC unit 32. The verification image of the control parameter identifying the HVAC unit 32 is preferably stored in the upper byte portions of these memory locations. The verification images for each of the thus stored control parameter values are the ones compliment of these stored values.

The value of a network identification of the HVAC system 12 is preferably stored in the lower byte portions of three successive memory locations having address indexes nine through eleven. The network identification value will, for instance, be used within a program executable by the processor 28 to identify itself to the HVAC systems controller for purposes of receiving information designated for HVAC system 12. The verification image of the value of the NTWK_ID variable is preferably stored in the upper byte portions of these memory locations. The verification images for each of thus stored values of the network identification values are preferably the twos complement of these stored values.

It is to be appreciated from the above that the verification images of the values of the HVAC type and the network identification parameters will have unique mathematical relationships with respect to the values of these control parameters. This is in contrast to the verification images for the control parameters stored in the memory locations having address indexes zero through five wherein all the respective verification images have the same mathematical relationship to the values of these control parameters.

Referring now to FIG. 4A, a process for reading the control information stored in the memory 30 begins with a step 40 that indicates that electrical power has been provided to the processor 28. The processor 28 proceeds to a step 42 and sets the memory address index "i" equal to zero. The processor proceeds in steps 44 through 50 to successively read the lower and upper bytes from address locations zero through five and compare these bytes for being mathematically equivalent in a step 47. In the event that the equivalency relationship is satisfied for a particular memory location, the processor will proceed in a step 48 to set a certain indexed control variable denoted as VARIABLE (k) equal to the lower byte of the memory location under examination. The processor preferably uses a look up table such as is set forth in FIG. 5 to identify the particular indexed control variable that is to be set equal to the lower byte of the memory location under examination. Referring again to step 47, in the event that the lower and upper bytes are not equivalent, the processor proceeds to set the indexed control variable for this memory location equal to a default value in a step 49. This is preferably accomplished by consulting the lookup table of FIG. 5 for the appropriate indexed variable and associated default value for the memory location. The processor increments the memory address index "i" in step 50 and proceeds to examine the bytes of the next memory location in step 47. The processor thereafter sets the identified indexed variable equal to the lower byte value or the default value. When the memory address index, "i" equals six, the processor proceeds from step 44 to a step 52 wherein an inquiry is made as to whether the memory address index, "i" is equal to nine. Since the memory address will initially equal six, the processor will proceed to a step 54 and read both the lower and upper bytes from the particular memory address location identified by the memory address index "i". The processor proceeds in a step 56 to inquire whether the thus read upper byte from the memory address location "i" is equal to the ones compliment of the lower byte read from the same memory address location.

Referring to FIG. 3, the verification image stored in the upper byte portion of each addressable location identified by memory address indexes six through eight should be the ones compliment of the unit type control parameter value. The read upper byte portion of the memory location under examination may not, however, have a ones complementary relationship with respect to the lower byte portion of this memory location if electrical noise is present during the reading. In this case, the processor 28 will proceed out of step 56 along the no path to a step 58 and increment the memory address index "i" by one. The processor will thereafter return to step 52 and again proceed to step 54 if the new memory address index does not equal nine. Assuming that the memory address has merely been incremented from six to seven, the processor will proceed to step 54 and read the lower and upper bytes from the memory address location indicated by the memory address index "i" equal to seven. The processor will again inquire in step 56 as to whether the upper byte is equal to the ones compliment of the lower byte stored in this particular memory address location. Assuming that the unit type control parameter and its ones compliment verification image have been accurately read from this addressable location, the processor will proceed from step 56 to step 60 and inquire as to whether the lower byte is within a specific range of permissible values. The permissible range of values for the control parameter is preferably in the look up table of FIG. 5. In the event that the lower byte from the addressable memory location identified by the current memory address index "i" is not within the indicated range of FIG. 5, the processor will proceed along the no path out of step 60 and again increment the memory address index "i" in step 58 before returning to step 52. Assuming the memory address index has now been incremented to eight, the processor will proceed to step 54 and again read the lower and upper bytes from the corresponding memory location. Inquiry will next be made as to whether the upper byte is equal to the ones compliment of the lower byte in step 56. Assuming a correct mathematical relationship of these values, the processor will proceed to step 60 and again inquire as to whether the lower byte is within the predetermined range of permissible values for the unit type control parameter. If the read value of the lower byte stored in memory storage location eight is within range of the permissible values for the unit type control parameter, the processor will proceed to a step 62 and set a variable denoted as UNIT_TYPE equal to the lower byte value. Referring again to steps 56 and 60, it is to be noted that if all memory address locations having the memory address indexes six through eight do not have a properly stored and read control parameter value and corresponding ones compliment verification image, then the processor will proceed in step 58 to increment the memory address index by one so as to be equal to nine. The processor will next proceed through step 52 to a step 64 wherein the UNIT_TYPE control variable is set equal to a default value. The processor proceeds to step 66 wherein a message as to the UNIT_TYPE being equal to a default value is generated. This message could, for instance, be displayed on the display 20.

It is to be appreciated that as a result of potentially reading up to three storage locations having the memory address indexes six through eight, the processor will have had an opportunity to verify a correct reading of the upper and lower bytes from at least one of these storage locations. For any such verification, the processor will also need to find that the value of a verified lower byte is within the permissible range for the unit type control parameter. In such a case, the processor will have set the UNIT_TYPE control variable equal to the value of the lower byte read from the particular storage location which passed the successive tests of steps 56 and 60. In the event that none of the byte values read from the storage locations six through eight passed the steps dictated by steps 56 and 60, then the processor will have set the UNIT_TYPE control variable equal to a default value and generated the message as to the UNIT_TYPE being a default value.

The processor will proceed out of either step 62 or step 66 to a step 67 and set the index "i" equal to nine. The process of reading and comparing lower and upper byte portions of one or more of the memory locations having address indexes of nine through eleven will occur in steps 68 through 82. It is to be remembered from FIG. 3 that these particular memory locations will have been set aside for storing values of the network identification control parameter and the respective verification images therefore. It is to be appreciated that as a result of reading and comparing the byte portions of possibly all three of these addressable memory locations, the processor will have either set a network identifier variable NTWK_ID from the look up table of FIG. 5, equal to a correctly verified value stored in one of these locations or it will have set the network identifier variable equal to a default value. The processor will have also generated an appropriate message in the event that this variable is set equal to a default value.

The processor will proceed out of either step 78 or step 82 to an exit step 84. The processor will thereafter implement various programs that depend on the particular set values of the control variables. In this regard, the programmed processor will for instance use the set values for the "k" indexed variables to implement various settings of the HVAC unit 32 whereas the value of the UNIT_TYPE variable will be used by the processor to configure any interface that may be required for the identified type of unit. Finally, the processor will use the set value for the NTWK_ID variable when identifying the HVAC system 12 to the HVAC system controller 10.

It is to be appreciated that the likelihood of having to use default values for either the UNIT_TYPE variable value or the NTWK_ID variable is substantially reduced due to the redundant recording of the corresponding control parameter values as well as the respective verification images thereof The redundant recording allows the processor to read up to three memory locations if necessary to obtain a correct reading of the particular control parameter value and its respective verification image. The unique verification images for these control parameters assures that the correct control parameter information that has been read and verified does in fact contain a control parameter value for the particular variable associated with the location.

It is to be appreciated that a particular embodiment of the invention has been described. Alterations, modifications and improvements thereto will readily occur to those skilled in the art. Accordingly, the foregoing description is by way of example only and the invention is to be limited only by the following claims and equivalents thereto.

What is claimed is:

1. A memory for storing values of control parameters used by a programmed processor to control a unit for providing conditioned air to a space to be heated or cooled, said memory comprising:

a first set of addressable storage locations having at least two distinct storage portions in each addressable storage location wherein one of the distinct storage portions in each addressable storage location contains the value of at least one of the control parameters used by the programmed processor to control the unit and the second distinct storage portion in the same addressable storage location contains the verification image of the value of the control parameter stored in the first distinct storage portion of the addressable storage location, said verification image in each addressable storage location having a mathematical relationship with respect to the value of the control parameter in the same addressable storage location; and a second set of addressable storage locations having at least two distinct storage portions in each addressable storage location wherein one of the distinct storage portions in each of said second set of addressable storage locations contains the value of a particular control parameter, the particular control parameter being different from the one or more control parameters having values stored in said first set of addressable storage locations and wherein the second of the distinct storage portions in each of said second set of addressable storage locations contains a verification image of the value of the particular control parameter wherein each verification image of the value of the particular control parameter in a second portion of an addressable storage location in said second set of addressable storage locations has a mathematical relationship with respect to the value of the particular control parameter stored in the first portion of the same addressable location that is substantially different from any mathematical relationship that a verification image of a value of a control parameter stored in a second portion of one of the first set of addressable storage locations has with respect to the stored value of that control parameter.

2. The memory of claim 1 further comprising:

a third set of addressable storage locations having at least two distinct storage portions in each addressable storage location wherein one of the distinct storage portions in each of said third set of addressable storage locations contains the value of a second particular control parameter, the second particular control parameter being different from the one or more control parameters having values stored in said first set of addressable storage locations and being furthermore different from the particular control parameter having values stored in said second set of addressable storage locations and wherein the second of the distinct storage portions in each of said third set of addressable storage locations contains a verification image of the value of the second particular control parameter wherein each verification image of the value of the second particular control parameter in a second portion of an addressable storage location in said third set of addressable storage locations has a mathematical relationship with respect to the value of the second particular control parameter stored in the first portion of the addressable storage locations that is substantially different from any mathematical relationship that a verification image of a value of a control parameter stored in a second portion of the first set of addressable storage locations has with respect to the stored value of that control parameter and from any mathematical relationship of a verification image of the value of the particular control parameter stored in the second portion of each of said addressable storage locations in said second set of addressable storage locations has with respect to the values of the particular control parameter stored in the first portions of each of said addressable storage locations in said second set of addressable storage locations.

3. The memory of claim 2 wherein the mathematical relationships of the verification images with respect to the values of the particular control parameter stored in said second set of addressable storage locations are all the same and wherein the mathematical relationships of the verification images with respect to the values of the second particular control parameter stored in said third set of an addressable storage location are all the same.

4. The memory of claim 1 wherein the mathematical relationships of the verification images with respect to the values of the particular control parameter stored in said second set of addressable storage locations are all the same.

5. The memory of claim 1 wherein the two distinct storage portions of each addressable storage location in both said first set of addressable storage locations and said second set of addressable storage locations each occupy the same bit storage locations in each addressable storage location.

6. A process for reading values of control parameters from addressable memory locations of a memory associated with a programmed processor wherein the values of the control parameters are used by the processor in the control of a unit that provides conditioned air to a space to be heated or cooled, said process comprising the steps of:

reading a first portion of a first addressable memory location containing the stored value of a first control parameter;

reading a second portion of the first addressable memory location containing a verification image of the value of the first control parameter;

comparing the read values of the first and second portions of the first addressable memory location;

using the read value of the first portion of the first addressable memory location in the control of the unit that provides conditioned air when said step of comparing the read values of the first and second portions of the first addressable memory location indicates that a certain required first mathematical relationship exists between the read values of the first and second portions of the first addressable memory location;

reading a first portion of a second addressable memory location containing the stored value of a second control parameter;

reading a second portion of the second addressable memory location containing a verification image of the value of the second control parameter;

comparing the read values of the first and second portions of the second addressable memory location; and using the read value of the first portion of the second addressable memory location in the control of the unit that provides conditioned air when said step of comparing the read values of the first and second portions of the second addressable memory location indicates that a certain required second mathematical relationship exists between the read values of the first and second portions of the second addressable memory location wherein the second mathematical relationship is substantially different from the first mathematical relationship required between the read values of the first and second portions of the first addressable memory location.

7. The process of claim 6 further comprising the steps of:

reading a first portion of a third addressable memory location containing the stored value of the second control parameter when said step of comparing the read values of the first and second portions of the second addressable memory location does not indicate that the certain required second mathematical relationship exists between the read values of the first and second portions of the second addressable memory location;

reading a second portion of the third addressable memory location containing a verification image of the value of the second control parameter;

comparing the read values of the first and second portions of the third addressable memory location; and using the read value of the first portion of the third addressable memory location in the control of the unit that provides conditioned air when said step of comparing the read values of the first and second portions of the addressable location indicates the second required mathematical relationship exists between the read values of the first and second portions of the third addressable memory location.

8. The process of claim 6 further comprising the step of:

reading a first portion of a fourth addressable memory location containing the stored value of a third control parameter;

reading a second portion of the fourth addressable memory location containing a verification image of the third control parameter;

comparing the read values of the first and second portions of the fourth addressable memory location;

using the read value of the first portion of the fourth addressable memory location in the control of the unit that provides conditioned air when said step of comparing the read values of the first and second portions of the fourth addressable memory location indicates that a certain required third mathematical relationship exists between the read values of the first and second portions of the fourth addressable memory wherein the third mathematical relationship is substantially different from either the second mathematical relationship required between the read values of the first and second portions of the second addressable memory location or the first mathematical relationship required between the first and second portions of the first addressable memory location.

9. The process of claim 8 further comprising the steps of:

reading a first portion of a fifth addressable memory location containing the stored value of the third control parameter when said step of comparing the read values of the first and second portions of the fourth addressable memory location does not indicate the existence of the third predetermined mathematical relationship between the read values of the first and second portions of the fourth addressable memory location;

reading a second portion of the fifth addressable memory location containing a verification image of the value of the third control parameter;

comparing the read values of the first and second portions of the fifth addressable memory location; and using the read value of the first portion of the fifth addressable memory location in the control of the unit that provides conditioned air when said step of comparing the read values of the first and second portions of the fifth addressable memory location indicates the third required mathematical relationship exists between the read values of the first and second portions of the fifth addressable memory location.

10. The process of claim 9 wherein said steps of using a read value of the first portion of a particular addressable memory locations in the control of the unit that provides conditioned air each comprise:

associating a particular control variable used by the processor in a control program with the particular memory location from which the values has been read;

setting the particular control variable equal to the value of the first portion of the particular memory location when the step of comparing read values of the first and second portions of the particular memory location indicates that the particular required mathematical relationship exists between the first and second portions of the particular memory location.

11. The process of claim 9 wherein the second and third mathematical relationships are numerical complementary relationships.

12. The process of claim 6 further comprising the step of:

reading a first portion of a third addressable memory location containing the stored value of a third control parameter, reading a second portion of the third addressable memory location containing a verification image of the third control parameter;

comparing the read values of the first and second portions of the third addressable memory location;

using the read value of the first portion of the third addressable memory location in the control of the unit that provides conditioned air when said step of comparing the read values of the first and second portions of the third addressable memory location indicates that a certain required third mathematical relationship exists between the read values of the first and second portions of the third addressable memory wherein the third mathematical relationship is substantially different from either the second mathematical relationship required between the read values of the first and second portions of the second addressable memory location or the first mathematical relationship required between the first and second portions of the first addressable memory location.

13. The process of claim 12 wherein said steps of using a read value of the first portion of a particular addressable memory location in the control of the unit that provides conditioned air each comprise:

associating a particular control variable used by the processor in a control program with the particular memory location from which the value has been read;

setting the particular control variable equal to the value of the first portion of the particular memory location when the step of comparing read values of the first and second portions of the particular memory location indicates that the particular required mathematical relationship exists between the first and second portions of the particular memory location.

14. The process of claim 13 further comprising the step of:

setting a particular control variable associated with a particular memory location equal to a default value when the step of comparing read values of the first and second portions of a particular memory location indicates that the particular required mathematical relationship does not exist between the read values of the first and second portions of the particular memory location.

15. The process of claim 12 wherein said second and third mathematical relationships are numerical complementary relationships.

16. The process of claim 6 wherein said steps of using a read value of the first portion of a particular addressable memory location in the control of the unit that provides conditioned air each comprise:

associating a particular control variable used by the processor in a control program with the particular memory location from which the value has been read;

setting the particular control variable equal to the value of the first portion of the particular memory location when the step of comparing read values of the first and second portions of the particular memory location indicates that the particular required mathematical relationship exists between the first and second portions of the particular memory location.

17. The process of claim 16 further comprising the step of:

setting a particular control variable associated with a particular memory location equal to a default value when the step of comparing read values of the first and second portions of a particular memory location indicates that the particular required mathematical relationship does not exist between the read values of the first and second portions of the particular memory location.

18. The process of claim 6 wherein at least one of the mathematical relationships is a numerical complementary relationship.

19. A memory for storing values of control parameters used by a programmed processor to control a unit for providing conditioned air to a space to be heated or cooled, said memory comprising:

a plurality of addressable storage locations each having at least two distinct storage portions therein where one of the distinct storage portions of each addressable storage location has a value of a control parameter stored therein and wherein the second portion of each addressable storage location has a verification image of the value of the control parameter that has been stored in the first portion of the same addressable storage location; and wherein a second portion of at least one of said plurality of addressable storage locations contains a verification image having a unique mathematical relationship with respect to the value of the particular control parameter stored in the first portion of the addressable location, said unique mathematical relationship being different from the mathematical relationship that any other verification image stored in a second portion of any other addressable storage location has with respect to the correspondingly stored value of the control parameter in that other addressable storage location in said memory except for any further verification images of stored values of the particular control parameter.

20. The memory of claim 19 wherein at least one further addressable storage location of said plurality of storage locations contains a verification image having a mathematical relationship with respect to the value of a second particular control parameter stored in the first portion of the further addressable storage location, said mathematical relationship of the verification image with respect to the value of the second particular control parameter being different from the mathematical relationship that any other verification image stored in a second portion of any other addressable storage location has with respect to the correspondingly stored value of the control parameter in that other addressable storage location in said memory except for any further verification images of stored values of the second particular control parameter.

* * * * *